Jan. 1, 1963  G. M. RAULINS  3,071,193
WELL TUBING SLIDING SLEEVE VALVE
Filed June 2, 1960  2 Sheets-Sheet 1
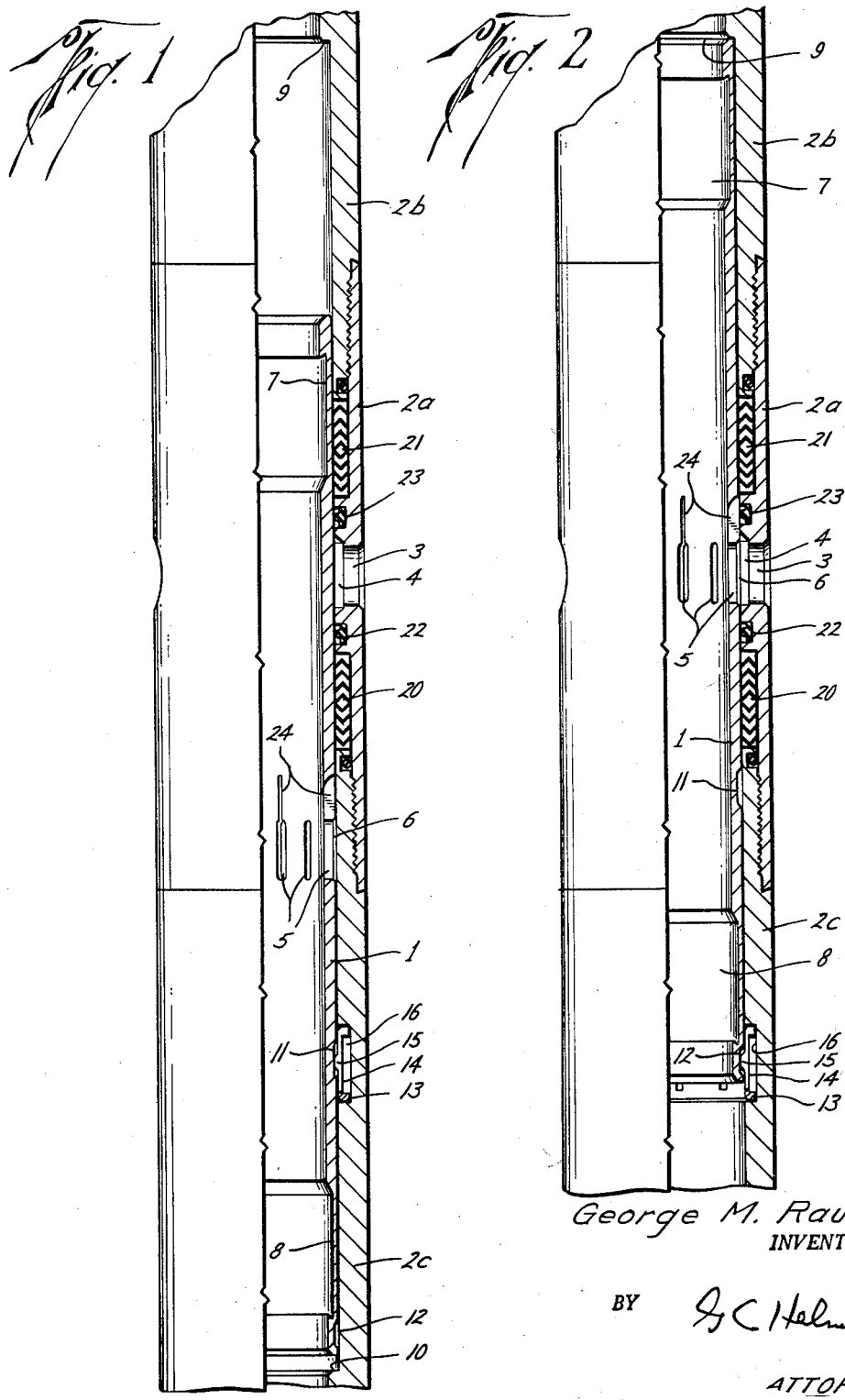
George M. Raulins
INVENTOR.
BY
ATTORNEY

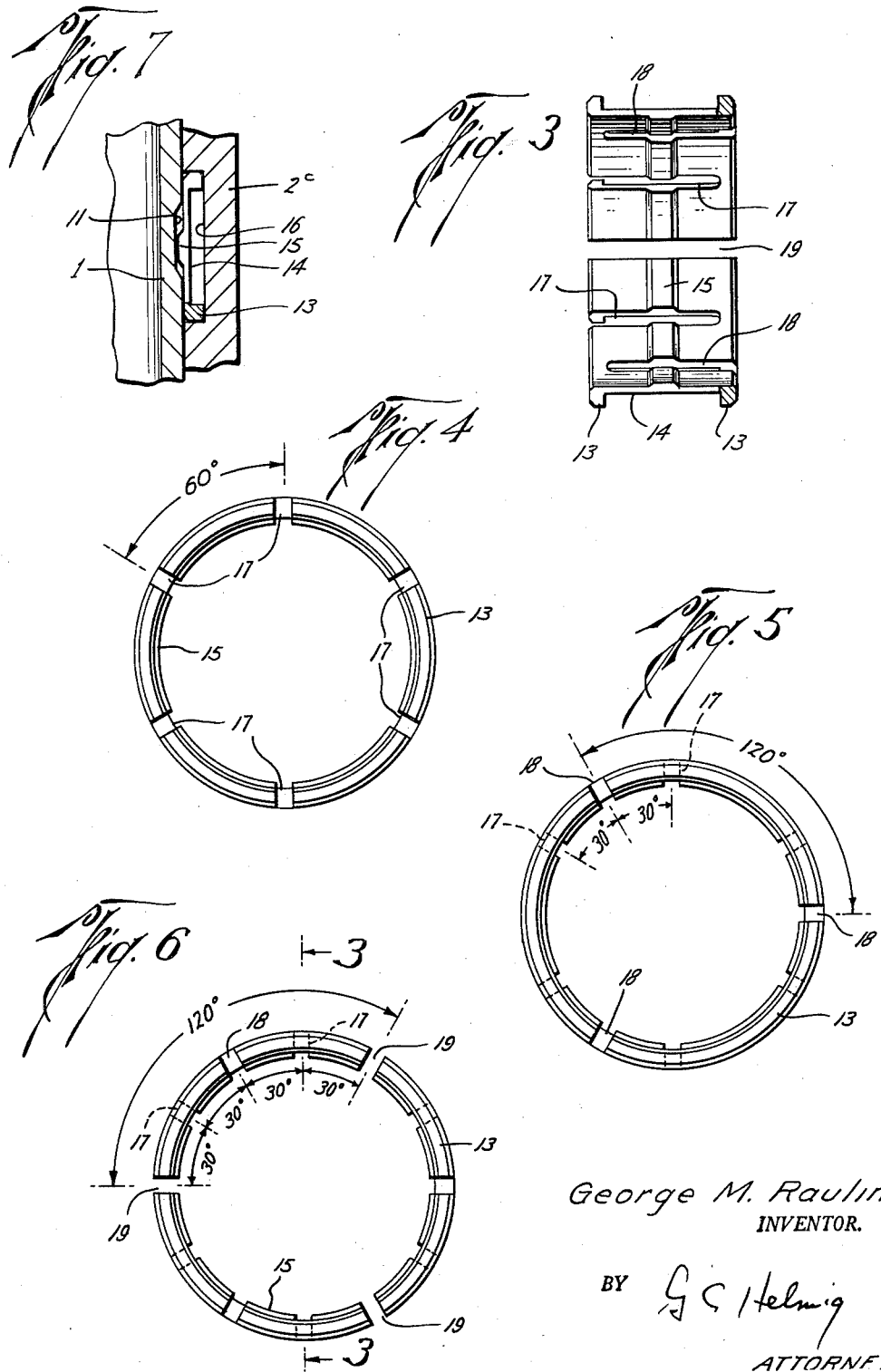

United States Patent Office 3,071,193
Patented Jan. 1, 1963

3,071,193
WELL TUBING SLIDING SLEEVE VALVE
George M. Raulins, Houston, Tex., assignor to Camco, Incorporated, Houston, Tex., a corporation of Texas
Filed June 2, 1960, Ser. No. 33,481
5 Claims. (Cl. 166—226)

This invention relates to a well flow control device and more particularly to an improved sleeve valve assembly for controlling subsurface communication through a passage in the side wall of a well conduit. To meet various conditions in the operation, maintenance and workover jobs of oil and gas wells, the practice on occasion is to install in the production tubing string one or more special nipples each with a slide valve which can be shifted, usually by wire line equipment, to open or close a side port provided in the nipple for flows between the tubing and the surrounding annulus space which may be either packed off from or in communication with a fluid producing zone.

It is an object of the present invention to provide such a valved nipple assembly wherein better sealing between slide bearing surfaces is obtained throughout a prolonged seal life, to extend the interval between replacement needs and to minimize leakage problems and required shutdown time delay and the heavy expense of tubing string pull-out and return.

A further object of the invention is to provide for an easing of pressure force application on the seals by elimination of abrupt seal pressuring change during valve travel between positions permitting and shutting off flow communication through the valved passage.

Another object of the invention is to provide a shiftable control valve assembly embodying an improved spring poppet annular structure for resisting displacement of the shiftable element from positions to which it has been set and which annular poppet has the advantages of being simple and cheap to produce and quick to install or replace without special fastenings but rather in drop-in security and which in use affords a large holding area throughout substantially the entire circumference of the tubular assembly.

Other objects and advantages will become apparent during the course of this disclosure of a preferred embodiment of the invention as contained in the accompanying drawings wherein FIGS. 1 and 2 are side elevations partly in section of the improved valve assembly in port closing and port opening positions respectively; FIG. 3 is a vertical cross section of a circular segmental spring poppet detail as viewed on line 3—3 of FIG. 6; FIGS. 4 and 5 are views from opposite sides of the poppet ring showing successive steps in manufacture; FIG. 6 is an elevation similar to FIG. 5 but illustrating the finally completed unit; and FIG. 7 is an enlarged fragmentary section of the assembly at the poppet.

The portion of a well flow production conduit seen in the drawings consists of a special nipple assembly consisting of inner and outer concentrically nested and relatively slidable tubes of which one will have its opposite ends screw threaded or otherwise arranged for attachment at a selected depth interval in the tubing string. Conveniently, the inner tube or sleeve 1 has slidable peripheral bearing on the inside of the outer tube, which for convenience of manufacture and assembly includes an intermediate coupling 2a internally threaded at opposite ends and connected in end to end succession with co-operating nipple elements 2b and 2c. Extending laterally through the side wall of the hollow tube section 2a are one or more side ports 3 leading into an annular distribution groove 4 formed internally of the wall surface in alignment with the circular ports 3. Co-operating side ports 5 extend through the wall of the slidable sleeve 1 and these preferably communicate with an external or peripheral annular groove 6 which in the port alignment position illustrated in FIG. 2 co-operates with and forms a part of the distribution channel 4. As indicated in the drawing, there are a circular succession of the axially elongated slots 5 for spreading the flow paths in relation to the internal tube area and the number of slots and their aggregate size and flow capacity should approximate and be related to the size and flow capacity and number of side ports 3 in the side wall of the nipple.

The internal diameter of the sliding sleeve 1 is preferably such as to correspond substantially with the internal tubing diameter so as to provide a full open bore through the nipple assembly.

Near its opposite or top and bottom ends, the sliding sleeve is provided with internal annular grooves 7 and 8, affording shoulders which are for co-operation with a suitable wire line tool in transmitting actuating forces in raising and lowering the slidable sleeve 1 within suitable limits defined in part by an upper downwardly facing shoulder 9 and a lower upwardly facing shoulder 10 which are spaced apart a distance exceeding the axial length of the tubular sleeve 1 and provide stop abutments for opposite sleeve ends. Actually, the lower and upper limits of sleeve travel are controlled by a pair of axially spaced annular peripheral grooves 11 and 12 preformed in the outer sleeve bearing surface for reception of a spring poppet mounted in the outer tube section 2c.

The spring poppet referred to comprises a circular succession of arcuate segments, each of generally channel shape and including top and bottom radially outwardly extending flanges or spacer legs 13 at opposite edges of an axially extending flexible web 14 from the medial portion of which there projects inwardly an arcuate rib 15 constituting a latching key or poppet formation for sleeve retaining reception within the groove 11, as seen in FIG. 1, or in the groove 12, as seen in FIG. 2, and which, due to the resiliency of the web, can be retracted radially outwardly and slide on the peripheral bearing surface between the grooves during sleeve travel from one position to the other. Because the segmental units are arranged to co-operate with one another and extend throughout substantially the entire circumference of the tubular members and because the inwardly projecting ribs 15 are coextensive and are formed throughout the arcuate dimension of each segment, the several ribs provide a substantially circumferentially continuous poppet latching surface when seated within either of the grooves 11 and 12. Because of this continuity and large bearing area, resistance to displacement of the sliding sleeve from either valve opening or valve closing position is distributed around the circumference for minimizing wear and affording better control of stop resistance to accidental displacement.

In the manufacture of the holding detent, a steel ring is first formed to provide a web 14 and the oppositely projecting outward side flanges 13 and inward annular ridge or rib 15. Then the wall of the web is weakened to impart thereto a desired resiliency by cutting a series of circularly spaced and axially extending milled slots or saw kerfs from both sides of the ring and throughout the major axial extent of the web and with each saw kerf ending short of the side opposite from that through which the cut was begun. More particularly, as seen in FIGS. 3–6, the original ring is operated upon to provide three segments which conveniently are identical to one another and in any event the arcuate extent of each segment is less than one hundred eighty degrees. This is to facilitate final assembly of the parts. The preformation of the outer tube section 2 included in its internal surface at the preselected point, an annular groove 16, of an axial length and depth for properly receiving the detent segments. These are introduced into the groove 16 through the bore of the section 2c, whereupon the sleeve 1 is slidably telescoped through the upper end of the section 2c and into overlapping relation with the segmental detent units. The depth of the groove 16 is controlled so that its bottom or outer base surface has a diameter corresponding substantially with the external diameter of the radial flanges 13—13 of the original ring and the radial dimension of the spacer flanges or legs presents the inside face of the web 14 in substantial cylindrical alignment with the bore surface of the outer tube section 2c. Accordingly, the internal diameters of the bore and the segment ring are approximately the same, whereby the inwardly extending poppet ridges or ribs 15 rise inwardly beyond the surface of the bore except at such times as the peripheral surface of the slide sleeve 1 is in bearing engagement with the ribs during sleeve movement between alignment positions of its grooves 11 and 12 with the ribs 15. The resiliency of each web accommodates its outward deflection during retraction force on the poppet rib 15 and causes the rib to snap into either of the grooves upon alignment therewith.

When three identical segments are employed, the formation of the saw kerfs is illustrated, by way of example, in FIGS. 4 and 5. As seen in FIG. 4, the original channel-shaped ring is cut into from one side at six equally spaced apart locations and provides kerfs or slits 17 on axial lines angularly spaced apart sixty degrees, as can be seen in FIG. 4. Thereafter, three additional cuts 18 are milled or sawed from the opposite edge of the ring at equal distances one hundred twenty degrees apart, with each kerf 18 being centralized between a pair of the previously cut openings 17. Each cut 18 with its associated pair of cuts 17 forms a set of three alternately projected slots whose center lines are angularly spaced at thirty degrees, as illustrated in FIG. 5. Thereafter, and in the three regions intermediate adjoining sets of three kerfs, the ring is severed, as at 19, into three segments by milling or cutting entirely through the ring, as illustrated in FIG. 6. Thus is formed the sleeve locator bracelet constituted by a circular succession of arcuate sections for easy placement internally of the body unit 2c.

In axially spaced relation above and below the side ports 3, the outer tube section 2a co-operates with the ends of tube sections 2b and 2c in providing internal annular pockets to receive circular packing rings 20 and 21, conveniently of conventional V-section type, for sliding and wiping contact with the peripheral surface of the shiftable port closure sleeve 1. In both regions between the side port 3 and the respective packings 20 and 21, the outer tubular section 2a carries shallow internal grooves to locate sealing rings 22 and 23, such as are commonly referred to as "GT" seal rings usually formed of synthetic rubber, and which also wipe on and hug the periphery of the sleeve 1 for supplementing the packings 20 and 21 in resisting interface leakage between the inner and outer tubes due to fluid differentials inside and outside of the conduit when the valve is in the closed position.

With well tubing valves as heretofore supplied, the travel of the port closure sleeve into and out of port opening position and when a wide pressure differential exists on opposite sides of the conduit, results in an abrupt change in fluid pressure force application on the seals, which tends to fatigue and impose strain inducive to abnormal wear and consequent short seal life. With this in mind and to minimize abrupt change in pressure application, it is here proposed to employ elongated openings 5 in the sleeve 1 for co-operative alignment with the side port 3 in establishing fluid passage freedom through the wall of the nipple and more particularly to associate with the sleeve openings 5 one or more axially extending narrow slits, as seen at 24, for allowing a small fluid movement both in advance of and immediately following alignment of the sleeve openings 5 with the side port 3. In the illustrated embodiment there are employed several ports 5 and alternate ones of which are provided with elongated narrow extensions 24 which may be conveniently formed by saw cuts through the wall of the sleeve. Relatively, the flow capacity of the restrictive extensions 24 during upward movement of the sleeve and as the alignment of the slots has initiated, is quite small and gradually increases until finally the sleeve movement is completed and the ports are in full alignment. Similarly, on down travel of the sleeve, the flow passage goes from fully open to fully closed size but the change is gradual. Because of the gradual change in the passage size, the pressure of fluids resisted by the seals does not change abruptly but the effect is relieved so as to eliminate sudden shock on the sealing elements, whereby the effective life of the seals is greatly prolonged.

Although the foregoing specification has been confined to but one embodiment of the invention, it is to be understood that various modifications can be made in the structure without departing from the scope of the appended claims.

What is claimed is:

1. In a well flow control device, a flow conduit tube having a side port therethrough, a port closure tube slidably fitted to the conduit tube and provided with a side port for alignment in one position with the conduit port and for misalignment therewith in another position, seal means on said flow conduit tube above and below the side port therethrough and in slide sealing engagement with the closure tube, the slide bearing surfaces of said tubes having in one thereof a pair of axially spaced apart detent positioning grooves and in the other thereof a detent locating pocket and a snap detent in said pocket comprising a channel section circular segment having its side legs fitted to said pocket and its crossweb rendered flexible by transverse saw kerfs projected partially across its width and said crossweb having a medial rib projected therefrom for snap fit to either of said positioning grooves, said detent and said positioning grooves being spaced in predetermined relations to the ports in the respective tubes for positioning the ports in alignment at the detent fitment to one of the positioning grooves and in misalignment at the detent fitment to the other of the positioning grooves.

2. In a well control device, a flow conduit having a side port, a slide valve fitted to the conduit for travel between port closing and opening positions, means sealing the interfaces of the valve and conduit on both sides of said port, annular groove means in the side bearing surfaces of the conduit and the valve in predetermined spaced relation with said port and an annular spring detent housed in one of the groove means for co-operation with the other groove means to thereby position the valve in one of said positions by reason of said predetermined spaced relation, said detent comprising a circular succession of segments each of channel cross section and weakened by saw kerfs extended from opposite sides and partially across the channel web and fitted with its side legs in bearing engagement with the bottom of said one of the groove means, said web having a circularly extending and radially projecting rib intermediate said side legs for snap-in seated engagement with the other groove means.

3. In a well flow control device, a flow conduit having in axially spaced apart relation a poppet housing annular groove internally of and a side port through the wall of the conduit, a port controlling sleeve slidably fitted to said wall for travel between port opening and port closing positions, co-operating interface sealing surfaces on the conduit and the sleeve above and below said port, said sleeve in predetermined relation with said port opening and closing positions being provided with axially spaced apart peripheral grooves for alternate alignment with the internal annular groove at port opening and closing positions respectively of the sleeve and poppet means housed within said internal annular groove and retained therein by the sleeve and comprised of circular segments of extents less than half the internal circumference of the conduit to permit their assembly and disassembly through the conduit and each segment having upper and lower radially outwardly projecting spacer legs in bearing engagement with the base of said internal annular groove and an externally extending resilient web connecting said legs and spaced thereby inwardly from the base of said internal annular groove to accommodate radial deflection of the web and an internal boss carried by the web medially of its axial extent and projected therefrom for co-operation with the external surface of said sleeve and for radially inward reception within said peripheral grooves respectively upon their individual alignment with the internal boss.

4. In a well flow control device, a flow conduit having in axially spaced apart relation a poppet housing annular groove internally of and a side port through the wall of the conduit, a port controlling sleeve slidably fitted to said wall for travel between port opening and port closing positions, co-operating interface sealing surfaces on the conduit and the sleeve above and below said port, said sleeve in predetermined relation with said port opening and closing positions being provided with axially spaced apart peripheral grooves for alternate alignment with the internal annular groove at port opening and closing positions respectively of the sleeve and poppet means housed within said internal annular groove and retained therein by the sleeve and comprised of circular segments of extents less than half the internal circumference of the conduit to permit their assembly and disassembly through the conduit and each segment having upper and lower radially outwardly projecting spacer legs in bearing engagement with the base of said internal annular groove and an externally extending resilient web connecting said legs and spaced thereby inwardly from the base of said internal annular groove to accommodate radial deflection of the web and an internal boss carried by the web medially of its axial extent and projected therefrom for co-operation with the external surface of said sleeve and for radially inward reception within said peripheral grooves respectively upon their individual alignment with the internal boss, each of said segments also having circularly spaced apart saw kerfs cut axially and alternately from and through opposite sides thereof for a distance to extend beyond said boss.

5. A segmental spring poppet and channel-shaped ring to be fitted within an annular groove in the wall of a pair of tubes having slide bearing on one another and to be held in said groove by the overlapping relation thereto of the wall of the other tube, said ring comprising a circular succession of arcuate segments each having an axially extending web with top and bottom spacer flanges projecting radially from one face of the web and accommodating radial deflection of the web in the region thereof between said top and bottom spacer flanges and with a latching rib projecting radially from the other face of the web and each segment also having axially extending slits spaced apart circularly and successively extended through opposite edges of the web toward and ended each short of the other edge thereof.

References Cited in the file of this patent

UNITED STATES PATENTS

| | | |
|---|---|---|
| 2,386,051 | Kempton | Oct. 2, 1945 |
| 2,784,728 | Bathurst et al. | Mar. 12, 1957 |
| 2,845,126 | Brown | July 29, 1958 |
| 2,951,536 | Garrett | Sept. 6, 1960 |